US011115118B2

(12) United States Patent
Bergqvist (10) Patent No.: US 11,115,118 B2
(45) Date of Patent: Sep. 7, 2021

(54) METHOD TO AUTHENTICATE A SUBSTRATE USING SPECKLE PATTERNS AND A DEVICE TO PERFORM THE METHOD

(71) Applicant: COLOP Digital GmbH, Wels (AT)

(72) Inventor: Johan Bergqvist, Zug (CH)

(73) Assignee: COLOP DIGITAL GMBH, Wels (AT)

( * ) Notice: Subject to any disclaimer, the term of this patent is extended or adjusted under 35 U.S.C. 154(b) by 0 days.

(21) Appl. No.: 16/614,006

(22) PCT Filed: May 16, 2017

(86) PCT No.: PCT/EP2017/061694
§ 371 (c)(1),
(2) Date: Nov. 15, 2019

(87) PCT Pub. No.: WO2017/198648
PCT Pub. Date: Nov. 23, 2017

(65) Prior Publication Data
US 2020/0083954 A1    Mar. 12, 2020

(30) Foreign Application Priority Data
May 18, 2016    (CH) .................................. 00638/16

(51) Int. Cl.
*G06K 9/00*    (2006.01)
*G06K 9/20*    (2006.01)
(Continued)

(52) U.S. Cl.
CPC ....... *H04B 10/116* (2013.01); *G06K 9/00577* (2013.01); *G06K 9/2018* (2013.01);
(Continued)

(58) Field of Classification Search
None
See application file for complete search history.

(56) References Cited

U.S. PATENT DOCUMENTS 6,584,214 B1 *    6/2003    Pappu ...................... G06K 9/00
340/5.86
7,806,322 B2    10/2010    Brundage et al.
(Continued)

FOREIGN PATENT DOCUMENTS

CH    710402 A2    5/2016
CH    710713 A2    8/2016
(Continued)

OTHER PUBLICATIONS

Cheun Ngen Chong et al: "Anti-counterfeiting with a Random Pattern", Emerging Security Information, Systems and Technologies, 2008. Securware '08. Second International Conference on, IEEE, Piscataway, NJ, USA, Aug. 25, 2008 (Aug. 25, 2008), pp. 146-153, XP031319483.
(Continued)

*Primary Examiner* — Darren E Wolf
(74) *Attorney, Agent, or Firm* — Paul D. Bianco; Gary S. Winer; Fleit Intellectual Property Law (57) ABSTRACT

Method to authenticate a substrate based on unique microstructure inherent to a region of interest of a substrate surface of the substrate, comprising the steps: (a) emitting photons from a light source onto the region of interest; (b) emitting ultrasound waves from a ultrasound source onto the region of interest; (c) capturing at least one image of the region of interest in one or both of the following two ways: (i) capturing a light image in the presence of ultrasound to obtain at least one captured image of the region of interest, or (ii) capturing an ultrasound echo image in the presence of IR or near IR light to obtain at least one captured image of the region of interest; and (d) comparing the at least one captured image with at least one reference in order to determine authenticity of the substrate.

8 Claims, 7 Drawing Sheets

(51) Int. Cl.
*G06K 9/52* (2006.01)
*G06K 9/62* (2006.01)
*G07D 7/121* (2016.01)
*G07D 7/2033* (2016.01)
*H04B 10/116* (2013.01)

(52) U.S. Cl.
CPC ............ *G06K 9/52* (2013.01); *G06K 9/6289* (2013.01); *G07D 7/121* (2013.01); *G07D 7/2033* (2013.01)

(56) References Cited

U.S. PATENT DOCUMENTS

| | | | |
|---|---|---|---|
| 7,853,792 | B2 | 12/2010 | Cowburn |
| 8,781,153 | B2 | 7/2014 | Sharma et al. |
| 2010/0007930 | A1* | 1/2010 | Cowburn ............ G06K 9/3241 358/488 |
| 2011/0096955 | A1* | 4/2011 | Voloshynovskiy ..... G07F 7/086 382/103 |
| 2014/0108786 | A1* | 4/2014 | Kreft ................... H04L 63/0428 713/156 |
| 2017/0030736 | A1 | 2/2017 | Yang et al. |
| 2018/0003983 | A1 | 1/2018 | Sako et al. |

FOREIGN PATENT DOCUMENTS

| | | |
|---|---|---|
| EP | 2257909 A2 | 12/2010 |
| WO | 2006/016114 A1 | 2/2006 |
| WO | 2009/115611 A2 | 9/2009 |
| WO | 2014/163014 A1 | 10/2014 |
| WO | 2016/083178 A1 | 6/2016 |
| WO | 2016/128196 A1 | 8/2016 |

OTHER PUBLICATIONS

Russell Cowburn: "Laser surface authentication—reading Nature's own security code", Contemporary Physics., vo 1. 49, No. 5, Sep. 1, 2008 (Sep. 1, 2008), pp. 331-342, XP055319237.
Lorenzo Cozzella et al: "Drug packaging security by means of white-light speckle", Optics and Lasers in Engineering, Elsevier, Amsterdam, NL, vol. 50, No. 10, May 21, 2012 (May 21, 2012), pp. 1359-1371, XP028500046.
José Bravo et al: "Application of Ultrasound Phase-Shift Analysis to Authenticate Wooden Panel Paintings", Sensors, vol. 14, No. 5, May 5, 2014 (May 5, 2014), pp. 7992-8002, XP055319054.
International Search Report dated Aug. 9, 2017 for PCT/EP2017/061694.
Written Opinion for PCT/EP2017/061694 dated May 16, 2017.
Haist et al., Optical detection of random features for high security applications, Preprint of Haist et al. Optics communications 147, 173-179 (1998).
Sharma et al., PaperSpeckle: Microscopic Fingerprinting of Paper, Research Gate, 12 pages, Oct 2011.
International Preliminary Report of Patentability, dated Nov. 20, 2018 for PCT/EP2017/061694, filed May 16, 2017.

* cited by examiner

Figure 6b

METHOD TO AUTHENTICATE A SUBSTRATE USING SPECKLE PATTERNS AND A DEVICE TO PERFORM THE METHOD

TECHNICAL FIELD

The present invention relates to a method and a device to authenticate naturally occurring living substrate surfaces, solid products or documents (substrate) based on microstructures or artifacts that are inherent to its surfaces. In the following the products or documents to be authenticated are referred to as substrate or authentication substrate.

BACKGROUND OF THE INVENTION

Authentication methodologies have been used and applied mostly within the field of biometric authentication. The need to authenticate humans has been around for a long time. The events that trigger such need vary from financial transactions to entering into a foreign country, voting, giving an exam, starting up a company, etc. Biometric authentication methods use the inherent and unique characteristics of individuals. Fortunately, human beings consist of complex organic systems that have high degrees of uniqueness. The most common organic feature utilized for authentication purposes has been fingerprints. More advanced methods can use the iris of the human eyes, blood vessel patterns hidden under the skin of the hand and the face. Other methods involve the use of voice. Most of these methods are based on image processing and recognition. These are possible because of the great diversity of features in the human body.

However, in a plain document or a common package, such great diversity does not exist. As a matter of fact, two documents or two packages of the same size look completely identical to one another at the first sight. With naked eye, there is no obvious alternative to differentiate two identical documents if there are no specific marks printed or written on them.

However, there is a less obvious although extremely robust alternative to differentiate not only apparently identical sheets of paper or packages but also small specific areas within the same paper sheet or the same package.

It is known through various research studies and through existing inventions in the same field, that the inherent microstructure of paper-pulp or any naturally occurring substrate based product, is so unique that a couple of square centimeters have enough details to be able to create a very robust authentication methodology. Examples are Swiss Patent Applications 101805/14 and 00189/15 from the same applicant. U.S. Pat. No. 8,781,153 describes a method using a speckle pattern extracted from a marked portion of a paper.

U.S. Pat. No. 7,853,792 discloses a method and apparatus for determining a digital signature from an article made of paper, cardboard, plastic or many other material types. A coherent light source directs a beam to illuminate the article and a detector arrangement collects data points from light scattered from many different parts of the article to collect a large number of independent data points, typically 500 or more. By collecting a large number of independent signal contributions specific to many different parts of the article, a digital signature can be computed that is unique to the area of the article that has been scanned. The principal optical components are a laser source for generating a coherent laser beam.

US20100007930 discloses a system for obtaining a signature from a scan area on the surface of an article comprising a signature generator that generates the signature from scattered coherent radiation detected from a plurality of points on the surface and includes a scan head comprising a coherent radiation source and photo detectors, a camera for capturing an image of the surface, a comparator that compares the captured image with a reference image to determine the location and orientation of the scan area, and a drive assembly that positions the scan head appropriately for generating a signature from the scan area in response to the determination of the location and orientation of the scan area.

U.S. Pat. No. 7,806,322 discloses an authentication method generally related to steganography and digital watermarking. The method includes receiving an object including a host object and auxiliary data steganographically embedded within the host object; determining geometric characteristics of the host object relative to expected geometric characteristics of the host object; and detecting the auxiliary data from the host object. The method can further include re-aligning or correcting geometric characteristics of the object based on a result of the act of determining prior to the act of detecting. This method does not use paper surface texture.

WO2014163014A1 discloses an information acquisition/identification system provided with an image-feature storing means, an extracting means, an acquiring means, and an identifying means. The image-feature storing means stores image features of texture patterns formed on components or products. The extracting means extracts an information-label image and a texture-pattern image from a taken image containing at least the following: an information label that displays information regarding a component, a product, or a product comprising said component; and a texture pattern formed on said component or product. The acquiring means acquires, from the extracted information-label image, the aforementioned information regarding the component or product. The identifying means identifies the component, product, or component-comprising product by matching image features of the extracted texture-pattern image against the image features stored by the image-feature storing means. This invention needs the images to be stored in a data base for comparison.

A method described by Sharma et al. ("PaperSpeckle: Microscopic Fingerprinting of Paper", Computer and Communications Security, 2001-Oct.-17, p. 99-110, DOI: 10.1145/2046707.2046721) uses coherent (LASER) or partially coherent (LED) light to be reflected from the substrate surface having an inherent unique microstructure in a given region of interest. The image recorded by the light reflected from the region of interest represents a speckle pattern that is unique to the region of interest of the analyzed substrate surface.

Haist et al. ("Optical detection of random features for high security applications", Optics Communications, vol. 147, 1998, p. 173-179) describes an authentication method based on paper fibers using visible light of a halogen lamp and a CCD camera.

SUMMARY OF THE INVENTION

It is an objection of the invention to provide an alternative more secure authentication method for substrates.

This is achieved by a method according to claim 1 and a device according to claim 7. Thus, the method to authenticate a substrate based on unique microstructure inherent to a region of interest of a substrate surface of the substrate, comprising the steps: (a) emitting photons from a light source onto the region of interest; (b) emitting ultrasound waves from a ultrasound source onto the region of interest; (c) capturing at least one image of the region of interest in one or both of the following two ways: (i) capturing a light image in the presence of ultrasound to obtain at least one captured image of the region of interest, or (ii) capturing an ultrasound echo image in the presence of IR or near IR light to obtain at least one captured image of the region of interest; and (d) comparing the at least one captured image with at least one reference in order to determine authenticity of the substrate.

In other words the invention combines the light waves and ultrasound waves in order to generate a light image and/or an ultrasound echo image of the region of interest with inherent speckle pattern for authentication purposes.

In some embodiments, the at least one captured image is compared to an at least one reference image previously taken from the same region of interest and stored in a database.

In some embodiments, the method further comprises the following steps: (a) extracting a plurality of specific features from the at least one captured image; (b) identifying the location of each specific feature; and (c) comparing the identified locations with reference identified locations from an at least one reference image previously taken from the same region of interest and stored in a database.

In some embodiments, the method further comprises the following steps: (a) extracting a plurality of specific features from the at least one captured image; (b) identifying the location of each specific feature; (c) generating a bit map of the identified location based on the specific features; and (d) comparing the bit map with a reference authentication mark representing the bit map or including the bit map in encoded form printed on or near the region of interest.

In all embodiments, the light source is a monochromatic light source.

In all embodiments, the light source is a coherent or partially coherent light source.

The invention further includes a device for authentication of a substrate performing the method of any of the previous claims, the device comprising: a light source to emit photons onto the region of interest of the substrate to be authenticated; an ultrasound transducer to emit ultrasound waves onto the region of interest of the substrate to be authenticated, e.g. a Capacitive micromachined ultrasonic transducers or a Piezoelectric Micromachined Ultrasonic Transducers; a light sensor, e.g. a CMOS sensor or a QIS (Quanta Image Sensor), able to capture a light image of the region of interest; an ultrasound detector arrangement able to capture an ultrasound echo image from the region of interest; and a microprocessor to operate the light source, the ultrasound transducer, the light detector and the ultrasound detector arrangement in order to capture the at least one image of the region selected from at least one of a light image in the presence of the emitted ultrasound or a ultrasound echo image in the presence of emitted photons.

In some embodiments, the light source is switchable between visible light of a predetermined wavelength and IR or near IR of a predetermined wavelength.

In some embodiments, the light source includes a visible LED light source and an IR or near IR LED light source.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention provides a device and a method to authenticate a substrate via its inherent microstructure on the substrate surface using photons (light waves) and acoustic signals (sound waves). The method includes the steps of emitting the photons using e.g. a visible LED light, IR or UV LED light and generating acoustic ultrasound signals using an ultrasonic transducer. The light waves and sound waves of one or more wavelengths are directed to a specified region of interest of the substrate surface.

After emitting, at least one image is captured from the specified region of interest of the substrate surface of the object using emitted waves of photons and acoustic signals to capture a CMOS image (light image) and an ultrasound echo image. After scanning, a score is generated for both the CMOS image and the ultrasound image by comparing their respective reference image in the database. Once the scores are generated for both images, the device compares the fusion scores with the reference fusion scores in the database to enable the authentication process. The authentication of the object is determined based on the score values. For example, if the average of above two score value is more than 80% then the object is an authentic one, the level of authentication decreases as the score lowers.

Figure 1:
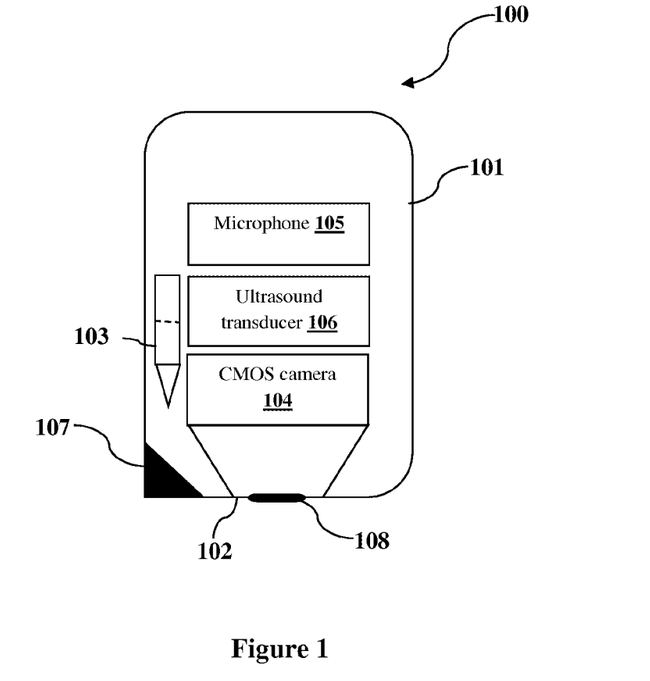
FIG. 1 illustrates a device to authenticate the substrate surface using photons and acoustic signals, according to one embodiment of the invention.

FIG. 1 illustrates a device to authenticate a substrate surface using photons and acoustic signals, according to one embodiment of the invention. The device (100) comprises a housing (101) with an aperture (102) at one side. The housing (101) includes a coherent or partially coherent source of light (103), a Complementary Metal-Oxide Semiconductor (CMOS) camera (104), a microphone (105), an ultrasonic transducer (106), a light bending optics (107) and a lens (108). In the preferred embodiment, during the CMOS imaging, source of light (103) and the ultrasonic transducer (106) are turned ON. The source of light (103) emits the photons and the ultrasonic transducer (106) produces the acoustic signals. A high frequency acoustic signal is liberated from the ultrasonic transducer (106) to the specified region of interest on the substrate surface. The visible wavelengths of photons are liberated to the specified region of interest on the substrate surface through the lens (108), wherein the lens (108) is fitted at the aperture (102). The specified region of interest on the substrate surface has the inherent microstructure, which is unique to every region of interest on any substrate. The surface microstructure is visible when the light or photon waves fall onto the substrate surface at an angle through the light bending optics (107). Once the photons and acoustic signals of known wavelengths are liberated at the specified region of interest of the substrate surface, the CMOS camera (104) captures an image of the region of interest. A photo acoustic speckle pattern appears when an image is captured in the presence of ultrasound acoustic signal.

The region of interest may be any region on the surface of the substrate e.g. paper for which an authentication mark or a reference image can be generated and printed onto the substrate or stored in database respectively. The device (100) extracts specific features from the specified region of interest of the substrate surface. The specific features are based on the bends of hills and valleys formed in the captured photo acoustic speckle image (CMOS or light image). For a particular region of interest, a number of locations are identified based on the bend of the hills and valleys of the surface micro structure of the substrate from the captured image. The device (100) further compares the captured image with a reference image in a database for authentication process.

In one embodiment, during the ultrasound imaging, the source of light (103), the microphone (105) and the ultrasonic transducer (106) are turned ON. The source of light (103) and the ultrasonic transducer (106) emit the photons and acoustic signals to the specified region of interest on the substrate surface. The high frequency acoustic signal is liberated from the transducer to the specified region of interest on substrate surface. The known wavelengths of photons, preferably IR or near IR light, are liberated to the specified region of substrate surface through the lens (108), wherein the lens (108) is fitted at the aperture (102). An acoustic pattern appears when a source of light interacts with the fiber structure of the substrate surface due to thermal expansion. Once the photons and acoustic signals of different wavelengths are liberated at the specified region of interest on the substrate surface, the microphone (105) calculates and captures an ultrasound echo image with the acoustic signals generated from the ultrasonic transducer and the acoustic pattern generated by the coherent source of light (103). In the preferred embodiment, the microphone (105) particularly calculates the ultrasound echo image that is reflected at the bends of hills and valleys of the specified region of substrate surface and also calculates the acoustic pattern caused by thermal expansion of the fibers in the presence of light source (103). The calculation includes the time period required for the waves of acoustic signals that reflect from the hills and valleys of the specified region of substrate surface and the time period required for the waves of the acoustic pattern by thermal expansion of fibers to reach the microphone. The captured ultrasound echo image it compared with a reference image in a database for authentication process.

In a further embodiment, the device (100) extracts the predetermined set of features from both the captured CMOS image and the ultrasound echo image. The device (100) generates a score for both the CMOS image and the ultrasound image by comparing the respective reference images in the database. Once the scores are generated for both images, the device (100) compares the fusion scores with the reference fusion scores in the database to enable the authentication process.

The comparison of the generated fusion scores with respect to the reference fusion score captured from the specified region of interest of the substrate surface provides a score as a percentage of matching of features. The authentication of the object is determined based on the score values. For example, if the score value is more than 80% then the object is an authentic one, the level of authentication decreases as the score lowers. The actual thresholds to determine authenticity are obtained through the statistical processing of a large number of known samples.

The source of light (103) is configured to switch between different frequencies of light e.g. visible and IR or near IR, as and when required.

Figure 2:
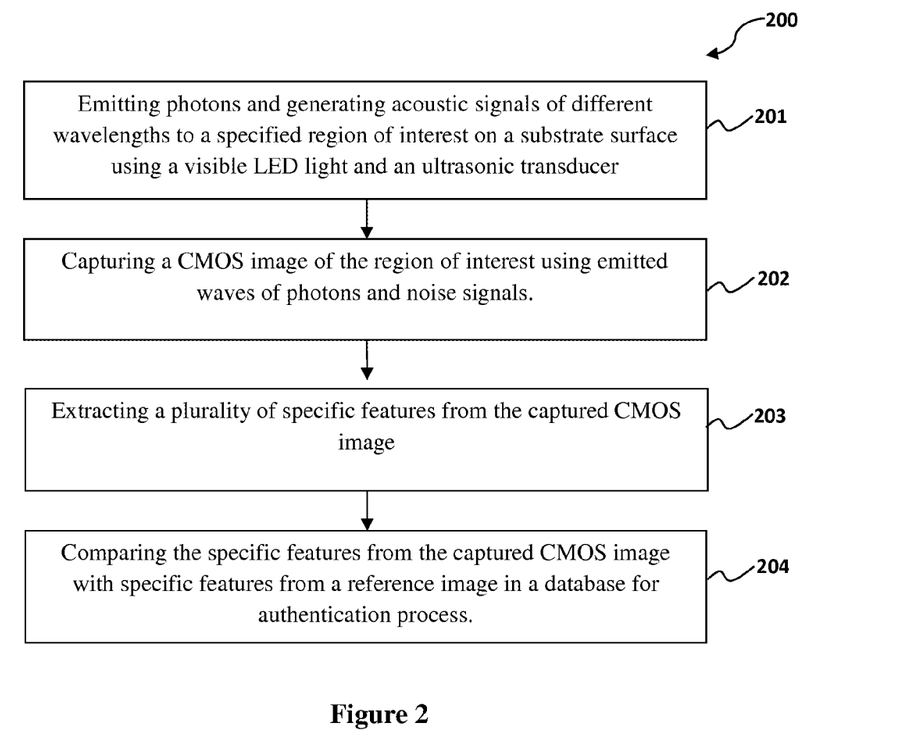
FIG. 2 illustrates a method to capture the CMOS image for authentication process using photons and acoustic signals, according to one embodiment of the invention.

FIG. 2 illustrates a method to capture the CMOS image (light image) for authentication process using photons and acoustic signals, according to one embodiment of the invention. The method (200) includes the step (201) of emitting the photons and generating acoustic signals of different wavelengths to a specified region of interest on the substrate surface through the lens using the visible LED light and the ultrasonic transducer. After emitting, at step (202), the specified region of substrate of the object is scanned using emitted waves of photons and acoustic signals to capture the CMOS image of the region of interest. After scanning, at step (203), the specific features from the captured CMOS image are extracted. Finally, at step (204), the specific features from the captured CMOS image are compared with the reference image in the database for authentication process. The reference images were previously captured in the same way for the same region of interest and stored in the database.

Figure 3:
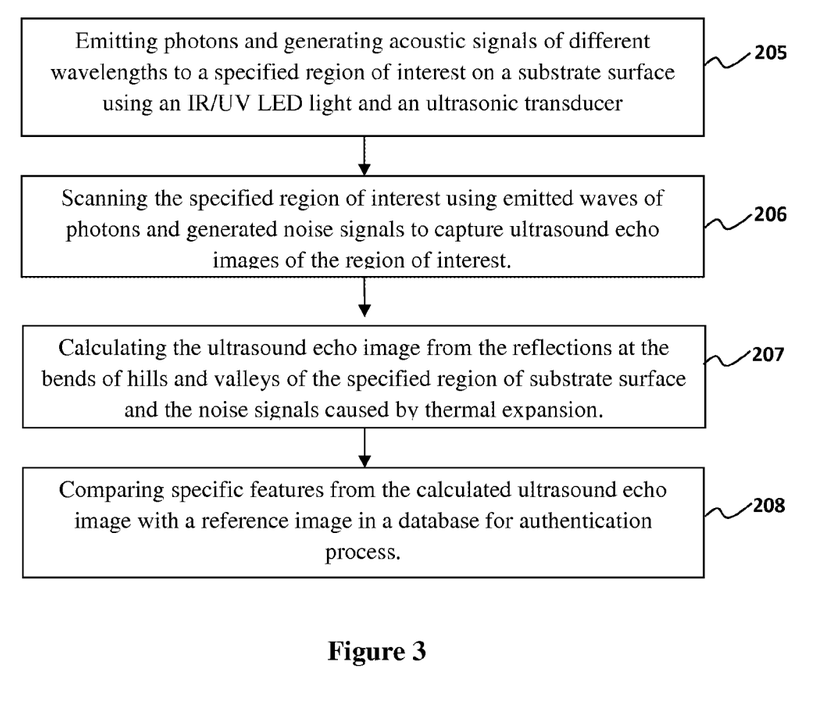
FIG. 3 illustrates the method to capture the ultrasound image for authentication process using photons and acoustic signals, according to one embodiment of the invention.

FIG. 3 illustrates the method to capture the ultrasound echo image for authentication process using photons and acoustic signals, according to one embodiment of the invention. The method includes the step (205) of emitting the photons and generating acoustic signals of different wavelengths to a specified region of interest on the substrate surface through the lens using the source of light, microphone and the ultrasonic transducer. After emitting, at step (206), the specified region of interest on the substrate surface of the object is scanned using emitted waves of photons and acoustic signals to capture the ultrasound echo image of the region of interest. After scanning, at step (207), the ultrasound echo image is calculated from the two sources. The first source is from the reflection at the bends of hills and valleys of the specified region of substrate surface and the second source is from the ultrasound noise signals caused by the thermal expansion of the fibers in the substrate when liberated by the source of light. The calculation includes the time period required for the waves of acoustic signals to reflect from the hills and valleys of the specified region of substrate surface and also includes a speckle pattern therein. Finally, at step (208), the specific features from the captured ultrasound image are compared with the reference image in the database for authentication process. The reference images were previously captured in the same way for the same region of interest and stored in the database.

Figure 4:
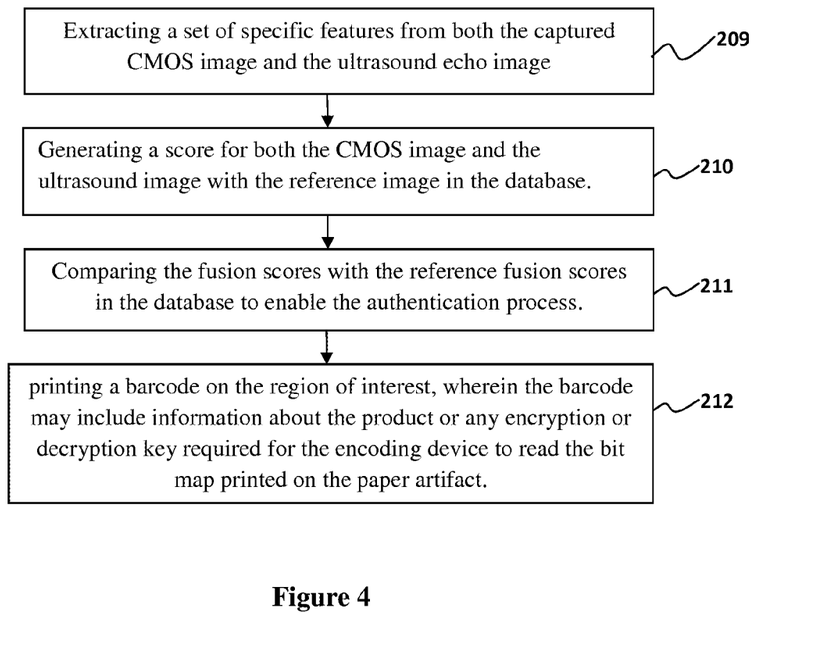
FIG. 4 illustrates the method to authenticate the substrate surface using photons and acoustic signals, according to one embodiment of the invention.

FIG. 4 illustrates the method to authenticate the substrate surface using photons and acoustic signals, wherein both above described image capturing methods are combined. The method includes the step (209) of extracting the set of specific features from both the captured CMOS image and the ultrasound echo image. After extracting, at step (210), a score is generated for both the CMOS image and the ultrasound image by comparing the reference images in the database. After generating, at step (211), the fusion scores of both images are compared with the reference fusion scores in the database to enable the authentication process. Finally, at step (212), a barcode or a authentication mark on or near the region of interest is printed. The barcode or mark may include information about the product or a bit map of the location of the specific features or any encryption or decryption key required for the encoding device to read a authentication mark printed on the substrate.

Figure 5A:
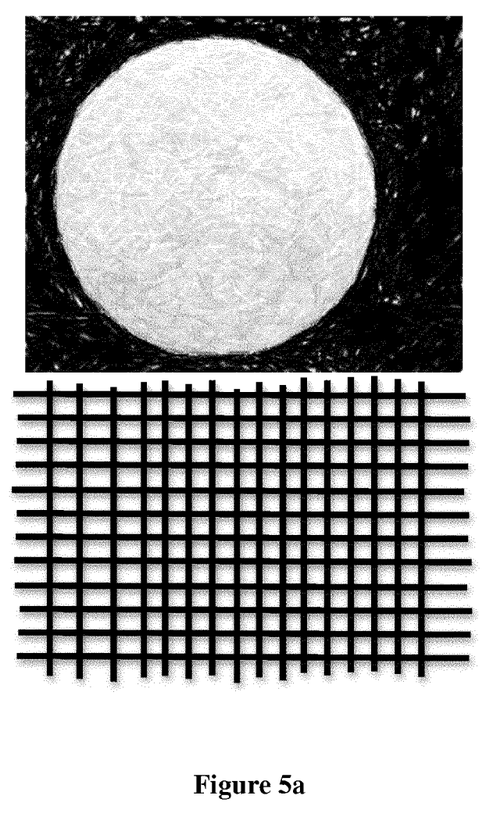
FIG. 5a shows the CMOS camera image without acoustic signal, according to one embodiment of the invention.

FIG. 5a shows the CMOS camera image without acoustic signal, according to one embodiment of the invention.

Figure 5B:
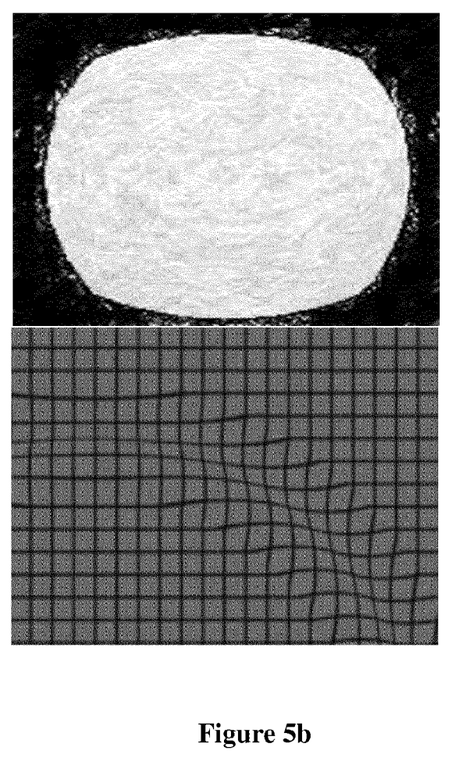
FIG. 5b shows the CMOS camera image with acoustic signal, according to one embodiment of the invention.

FIG. 5b shows the CMOS camera image with acoustic signals, according to one embodiment of the invention.

Figure 6A:
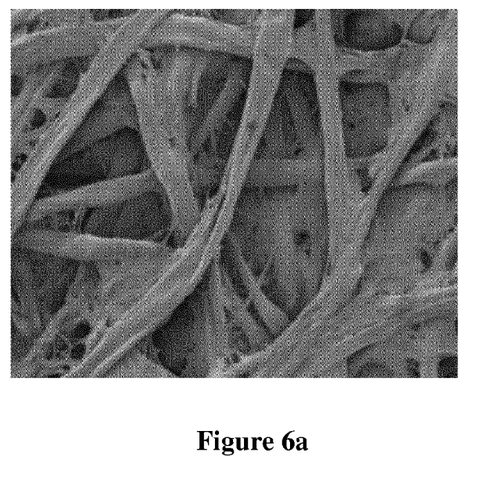
FIG. 6a shows the ultrasound echo image without acoustic signal, according to one embodiment of the invention.

FIG. 6a shows the ultrasound echo image without acoustic signals, according to one embodiment of the invention.

Figure 6B:
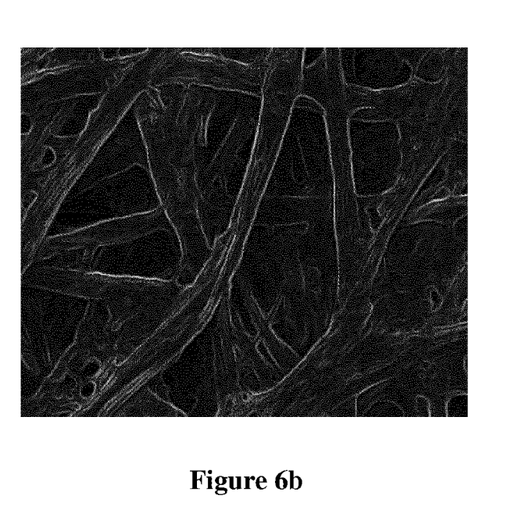
FIG. 6b shows the ultrasound echo image with acoustic signal, according to one embodiment of the invention.

FIG. 6b shows the ultrasound echo image with acoustic signals, according to one embodiment of the invention.

The present invention helps in checking the counterfeit to a great extent.

The invention claimed is:

1. A method to authenticate a substrate based on unique microstructure inherent to a region of interest of a substrate surface of the substrate, the method comprising:
    a. emitting photons from a light source onto the region of interest;
    b. emitting ultrasound waves from an ultrasound source onto the region of interest;
    c. capturing at least one photo acoustic speckle image of the region of interest by capturing a light image from the emitted photons in the presence of the emitted ultrasound to obtain the at least one captured photo acoustic speckle image of the region of interest; and
    d. comparing the at least one captured photo acoustic speckle image with at least one reference in order to determine authenticity of the substrate,
    wherein step d further comprises:
    e. extracting a plurality of specific features from the at least one captured image;
    f. identifying the location of each specific feature; and
    g. comparing the identified locations with reference identified locations from an at least one reference image previously taken from the region of interest and stored in a database.

2. The method according to claim 1, wherein step g further comprises the following steps:
    h. generating a bit map of the identified location based on the specific features; and
    i. comparing the bit map with a reference authentication mark representing the bit map or including the bit map in encoded form printed on or near the region of interest.

3. The method according to claim 1, wherein the light source is a monochromatic light source.

4. The method according to claim 1, wherein the light source is a coherent or partially coherent light source.

5. A device for authentication of a substrate performing the method of claim 1, the device comprising:
    a coherent or partially coherent light source to emit photons onto the region of interest of the substrate to be authenticated;
    an ultrasound transducer to emit ultrasound waves onto the region of interest of the substrate to be authenticated;
    a light sensor able to capture a light image of the region of interest exposed by the emitted photons;
    a microprocessor to operate the light source, the ultrasound transducer, and the light detector in order to capture the at least one photo acoustic speckle image of the region and to compare the photo acoustic speckle pattern of the at least one captured photo acoustic speckle image with at least one reference in order to determine authenticity of the substrate.

6. A device to authenticate a substrate based on unique microstructure inherent to a region of interest of a substrate surface of the substrate, the device comprising:
    a coherent or partially coherent light source to emit photons onto the region of interest of the substrate to be authenticated;
    an ultrasound transducer to emit ultrasound waves onto the region of interest of the substrate to be authenticated;
    a light sensor able to capture a light image of the region of interest exposed by the emitted photons;
    a microprocessor to operate the light source, the ultrasound transducer, and the light detector in order to capture at least one photo acoustic speckle image of the region and to compare a photo acoustic speckle pattern of the at least one captured photo acoustic speckle image with at least one reference in order to determine authenticity of the substrate,
    wherein the light source is switchable between visible light of a predetermined wavelength and IR or near IR of a predetermined wavelength.

7. The device according to claim 5, wherein the light source includes a visible LED light source and an IR or near IR LED light source.

8. The device according to claim 6, wherein the light source includes a visible LED light source and an IR or near IR LED light source.

* * * * *